United States Patent [19]

Johnson et al.

[11] Patent Number: 5,567,091
[45] Date of Patent: Oct. 22, 1996

[54] SWING-ARM AIR CONVEYOR AND FLEXIBLE GUIDE JOINT FOR CONVEYING BOTTLES WITH NECK FLANGES

[75] Inventors: Mike Johnson; Richard R. Lile, both of Spokane, Wash.

[73] Assignee: R. A. Pearson Company, Spokane, Wash.

[21] Appl. No.: 432,798

[22] Filed: May 2, 1995

[51] Int. Cl.⁶ .................................................. B65G 51/03
[52] U.S. Cl. ............................ 406/182; 406/88; 406/196
[58] Field of Search ..................................... 406/1, 2, 3, 4, 406/5, 6, 7, 8, 9, 86, 88, 181, 182, 183, 196

[56] References Cited

U.S. PATENT DOCUMENTS

| | | | |
|---|---|---|---|
| 393,584 | 11/1888 | Robinson | 406/35 |
| 721,743 | 3/1903 | Richmond | 406/182 |
| 907,692 | 12/1908 | Hervey et al. | 406/196 |
| 1,647,714 | 11/1927 | Oppenheim et al. | 406/165 |
| 2,208,269 | 7/1940 | Cartlidge | 198/589 |
| 2,269,078 | 1/1942 | Cartlidge | 198/516 |
| 2,512,610 | 6/1950 | Cartlidge | 198/861.2 |
| 2,722,306 | 11/1955 | Cartlidge et al. | 198/861.2 |
| 2,795,315 | 6/1957 | Hahir et al. | 198/803.3 |
| 3,367,603 | 2/1968 | Feyerherd | 406/182 |
| 3,379,219 | 4/1968 | Schuh et al. | 138/118 |
| 3,580,640 | 5/1971 | Eriksson | 406/19 |
| 3,614,168 | 10/1971 | Range | 406/2 |
| 3,684,327 | 8/1972 | Hurd | 406/86 |
| 3,685,632 | 8/1972 | Brady | 406/88 |
| 3,731,823 | 5/1973 | Goth | 406/88 |
| 3,796,296 | 3/1974 | Bakker | 198/735.6 |
| 3,850,478 | 11/1974 | Hurd | 406/86 |
| 3,868,071 | 2/1975 | Weaver | 406/182 |
| 3,953,076 | 4/1976 | Hurd | 406/88 |
| 3,999,651 | 12/1976 | Steinkuhl | 198/735.6 |
| 3,999,806 | 12/1976 | Hurd | 406/181 |
| 4,016,788 | 4/1977 | Hardy | 83/72 |
| 4,139,087 | 2/1979 | Westhoff et al. | 198/309 |
| 4,284,370 | 8/1981 | Danler et al. | 406/86 |
| 4,378,182 | 3/1983 | Futer | 406/10 |
| 4,822,214 | 4/1989 | Aidlin et al. | 406/86 |
| 4,938,636 | 7/1990 | Aidlin et al. | 406/31 |
| 4,944,635 | 7/1990 | Carlier et al. | 406/10 |
| 4,974,721 | 12/1990 | Born | 198/434 |
| 5,028,174 | 7/1991 | Karass | 406/88 |
| 5,100,265 | 3/1992 | Mirkin | 406/86 |
| 5,107,978 | 4/1992 | Andrew | 198/437 |
| 5,147,153 | 9/1992 | Aidlin et al. | 406/86 |
| 5,161,919 | 11/1992 | Smith et al. | 406/86 |
| 5,209,339 | 5/1993 | Antonissen | 198/436 |
| 5,213,451 | 5/1993 | Frank et al. | 406/72 |
| 5,246,314 | 9/1993 | Smith et al. | 406/86 |

*Primary Examiner*—Andrew C. Pike
*Attorney, Agent, or Firm*—Wells, Ste. John, Roberts, Gregory & Matkin, P.S.

[57] ABSTRACT

A method and apparatus for the feeding and accumulation of bottles in an air conveyance system, which has a swing-arm air conveyor with a flexible guide joint which allows the efficient conveyance of bottles from a single-lane source of bottles to a plurality of recipient air conveyors for accumulation and handling. The swing-arm air conveyor also includes a second flexible guide joint which provides for the delivery of the bottles to the recipient air conveyors in a direction parallel to the direction of the single-line source of bottles. The apparatus and method is also used for the conveyance of bottles from a plurality of feed air conveyors to a single-lane recipient air conveyor. The flexible guide joint allows the swing-arm air conveyor to be pivoted while still maintaining a continuous chamber through which bottles are conveyed.

15 Claims, 10 Drawing Sheets

SWING-ARM AIR CONVEYOR AND FLEXIBLE GUIDE JOINT FOR CONVEYING BOTTLES WITH NECK FLANGES

TECHNICAL FIELD

The present invention relates to neck guided air conveyor equipment for blown plastic bottles and the use of flexible guide joints, which allow an air conveyor swing arm to be used between a single lane conveyor and a plurality of air conveyors.

BACKGROUND OF THE INVENTION

Plastic bottles which are blow-molded are commonly used to contain a number of consumer products, including beverages. Advances in the technology of blow molding plastic bottles have allowed the bottles to be manufactured using less plastic material, resulting in lighter weight bottles which are less stable during handling and conveying.

Figure 6:
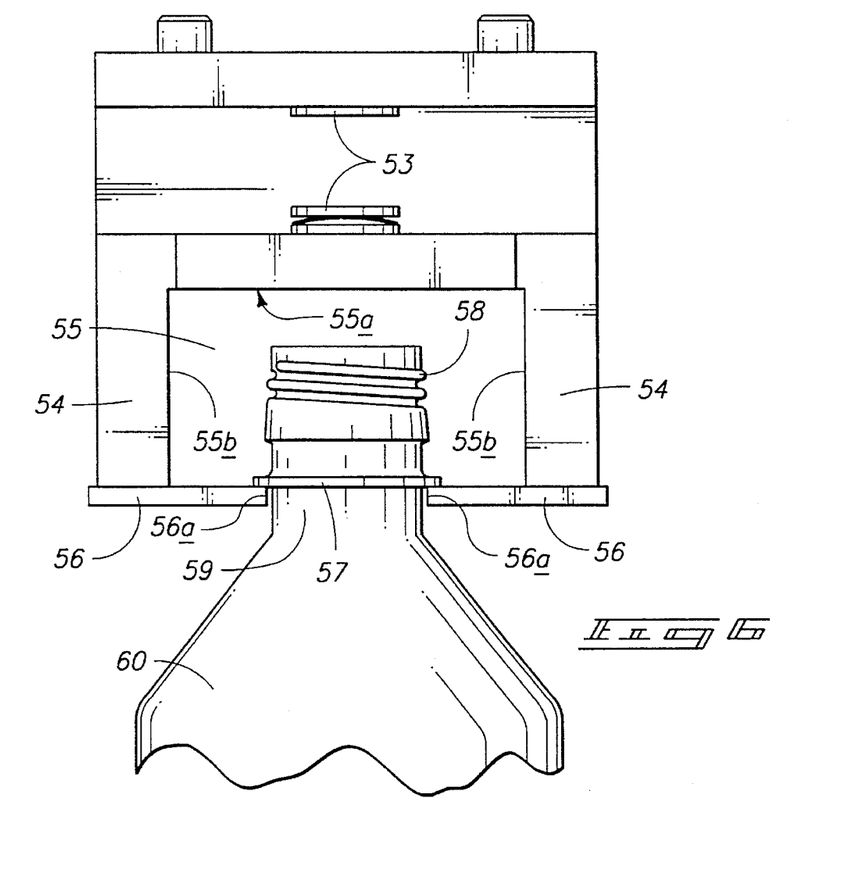
FIG. 6 is a side view of the lower portion of a joint member which can be used in the flexible guide joint.

The relevant parts of a typical blow-molded plastic bottle, as illustrated in FIG. 6, include a body portion 60, threads 58, and a neck flange 57.

Plastic bottles with circular neck flanges have been conveyed by air conveyors which have corresponding surfaces to support the neck flanges. An example of such an air conveyor is set forth in U.S. Pat. No. 4,284,370, issued to Danler et al.

The feeding and accumulation of plastic bottles presents handling and conveyance problems because of their low weight and because freshly molded bottles that are being conveyed have not completely cooled and tend to be somewhat sticky. In order to transition between one feed lane and several lanes, there must necessarily be areas where the conveyed plastic bottles are diverted from their direction of travel so that either a single lane or a plurality of lanes are thereby achieved.

Plastic bottles are very prone to binding and jamming in conveyance and accumulation equipment, especially at locations where the direction of flow of a conveyance lane is diverted. The angles or changes in direction of the flow of the plastic bottles lead to jamming and binding. Typically, the greater the angle of diversion, and the lower the weight of the plastic bottles, the more prone the conveyance system becomes to problems of this nature.

Existing conveying and accumulation machinery and methods attempt to minimize the jamming of the plastic bottles by making the transition in a series of steps wherein one conveyor may be split into two and then each of the two conveyors split into two again, and so on, until the desired number of parallel conveyors is attained. The same is true in the reverse when transition and feeding is required from several conveyor lanes to a fewer number or to a single lane conveyor.

Existing conveying and accumulation machinery and methods using the stepped means to reduce jamming require a substantial amount of floor space to achieve the desired transition. The reduced stability of the lighter weight bottles conveyed through existing conveying and accumulation machinery still results in an unacceptably high rate of jamming in the transition areas and corners due to the sudden changes in direction of the plastic bottles combined with the other factors of the bottles discussed above.

The need for effective and reliable conveying and accumulation machinery and methods has been recognized, but has not been adequately fulfilled by prior known machinery or methods.

A further need has been recognized for such conveying and accumulation machinery that greatly minimizes the jamming and consequent downtime, especially when conveying lighter weight plastic bottles.

A still further need has been recognized for such conveying and accumulation machinery which occupies far less floor space than prior known machinery and which is simpler and more reliable by the very nature of its design.

The forenamed recognized needs have not heretofore been sufficiently fulfilled by existing conveying and accumulation machinery and methods.

The present invention addresses the problems associated with existing container body air conveying equipment, particularly those problems at transition points which have been magnified by the conveying of the lighter weight plastic bottles. The present invention addresses the problems described above in a way that has the advantage of requiring substantially less floor space.

The present invention utilizes a flexible guide joint for connection to an air conveyor and a swing-arm mechanism which more reliably and effectively allows the feeding and accumulation of container bodies from one lane to several, and conversely from several lanes to one. The present invention also utilizes the flexible guide joint in combination with the swing-arm and can further utilize a second flexible guide joint at a second end of the swing-arm, such that the input to the first flexible guide joint is substantially parallel to the output of the second flexible guide joint. In addressing the forenamed problems the way this invention does, this invention has the further advantage of greater reliability in conveying the container bodies with reduced jamming and reduced equipment downtime.

BRIEF DESCRIPTION OF THE DRAWINGS

Preferred embodiments of the invention are described below with reference to the accompanying drawings, which are briefly described below.

FIG. 3 is a top view of the application of the invention wherein there is one flexible guide joint at the first end of the swing-arm conveyor;

FIG. 10 is a bottom view of one application of a flexible guide joint in a flexed position;

FIG. 12 is a top view of one application of the invention; and

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection, process, and other means and components utilized in this invention are widely known and used in the field of the invention described, and their exact nature or type is not necessary for an understanding and use of the invention by a person skilled in the art or science, and they will not therefore be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefore be discussed in significant detail.

Figure 1:
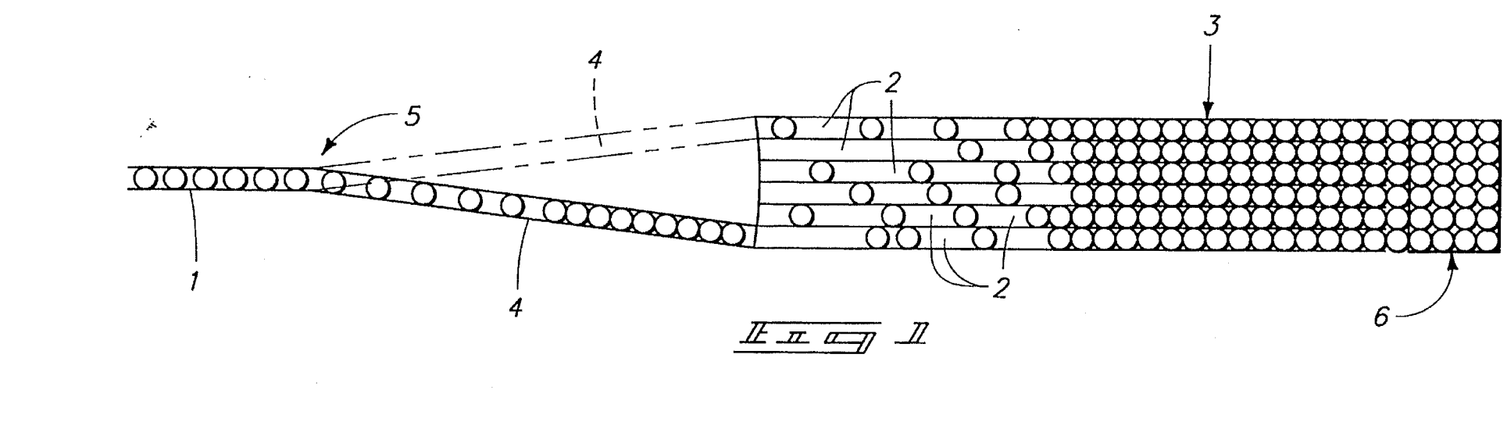
FIG. 1 is a schematic bottle flow diagram of the application of the invention wherein a single lane bottle path feeds the swing-arm conveyor, which conveys the bottles to any one of a plurality of parallel bottle paths.

FIG. 1 is a schematic bottle flow diagram which shows the application of this invention wherein there is a single lane source or path 1 of bottles and a plurality of parallel bottle paths 2. The direction of travel of the bottles in FIG. 1 is from left to right. The single lane path or source 1 of bottles serves as the source 1 of bottles and can be an air conveyor, belt conveyor or other conveyor, to feed bottles through flex joint 5 and to the swing-arm conveyor 4.

As bottles are fed to the swing-arm conveyor 4, the swing-arm conveyor 4 can be moved adjacent to a selected bottle path of a plurality of recipient air conveyors 2, which convey the bottles to the accumulation area 3. A second extreme position of conveyor 4 is shown in dashed lines.

Accumulation area 3 serves as the multi-lane source of bottles for further processing or handling of the bottles, such as by a bottle packer 6. In FIG. 1, the accumulation area 3 feeds a bottle packer 6 which places the bottles into containers for subsequent handling or shipment.

Figure 2:
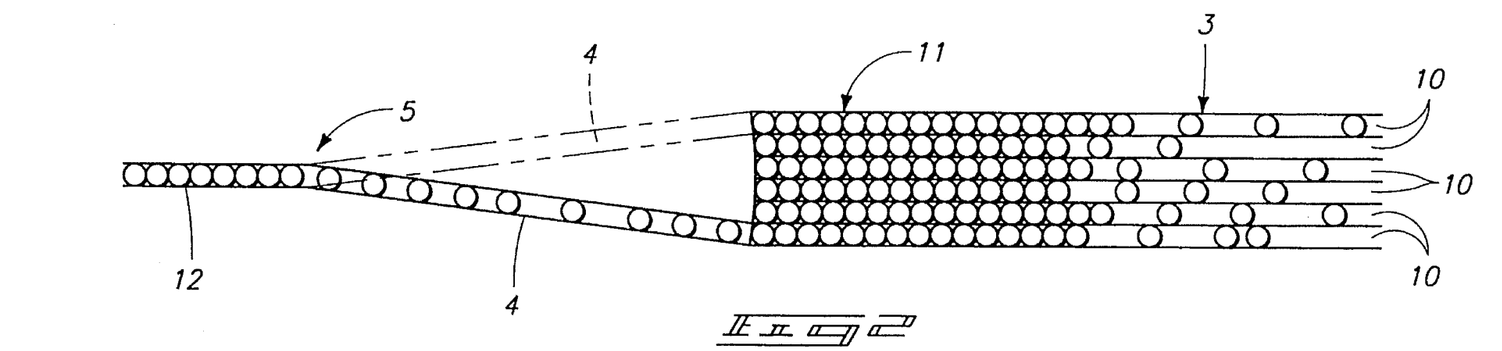
FIG. 2 is a schematic bottle flow diagram of the application of the invention wherein a plurality of parallel bottle paths supply bottles to the swing-arm conveyor, which conveys the bottles to the recipient single bottle path.

FIG. 2 is a schematic bottle flow diagram which shows the application of this invention wherein there is a plurality of parallel bottle paths or air conveyors 10. The direction of travel of the bottles in FIG. 2 is from right to left. The plurality of air conveyors 10 feed bottles to the accumulation area 11 for conveyance by the swing-arm conveyor 4 through the flex joint 5 and to the single lane path or air conveyor 12, for subsequent handling.

The swing-arm conveyor 4 in FIG. 2 can also be moved to a selected one of the plurality of air conveyors 10 to receive bottles therefrom and to convey the bottles to the single lane air conveyor 12.

FIG. 3 is a top view of the swing arm mechanism with one flexible guide joint. It illustrates application of the invention wherein there is a first flexible guide joint 5 at the first end 4a of the swing-arm conveyor 4. A single lane conveyor 15 is operatively connected to the first flexible guide joint 5. The swing-arm conveyor 4 is an air conveyor apparatus for conveying plastic bottles which have a neck flange.

The second end 4b of the swing-arm conveyor 4 can be operatively connected to any one of the plurality of air conveyors 16 by pivotal or angular movement of the swing-arm conveyor 4 with respect to framework 7 and about a vertical axis. The first ends 16a of the air conveyors 16 are arcuately arranged with respect to the pivotal axis of swing-arm conveyor 4, such that when the swing-arm conveyor 4 is moved from air conveyor 16 to air conveyor 16, the second end 4b of the swing-arm conveyor 4 operatively connects to the first end 16a of a selected air conveyor 16.

The single bottle path 15 shown in FIG. 3 can either be a single lane source of bottles or a single lane recipient air conveyor, depending on whether the application of the invention is a single lane source of bottles feeding a plurality of recipient air conveyors or whether it is a plurality of feed air conveyors feeding a single lane recipient air conveyor.

The plurality of air conveyors 16 shown in FIG. 3 can either be a plurality of recipient air conveyors to receive bottles from the swing-arm conveyor 4, or can be a plurality of feed air conveyors which provide the feedstock of bottles for the swing-arm conveyor 4 to convey to the single lane conveyor 15, depending on the specific application of the invention.

When the swing-arm conveyor 4 is moved from one air conveyor 16 to a second air conveyor 16, the angle between the swing-arm conveyor 4 and the single bottle path 15 is adjusted about the vertical pivotal axis of conveyor 4. Flexible guide joint 5 maintains a continuous conveyance path through which bottles can be conveyed.

Figure 4:
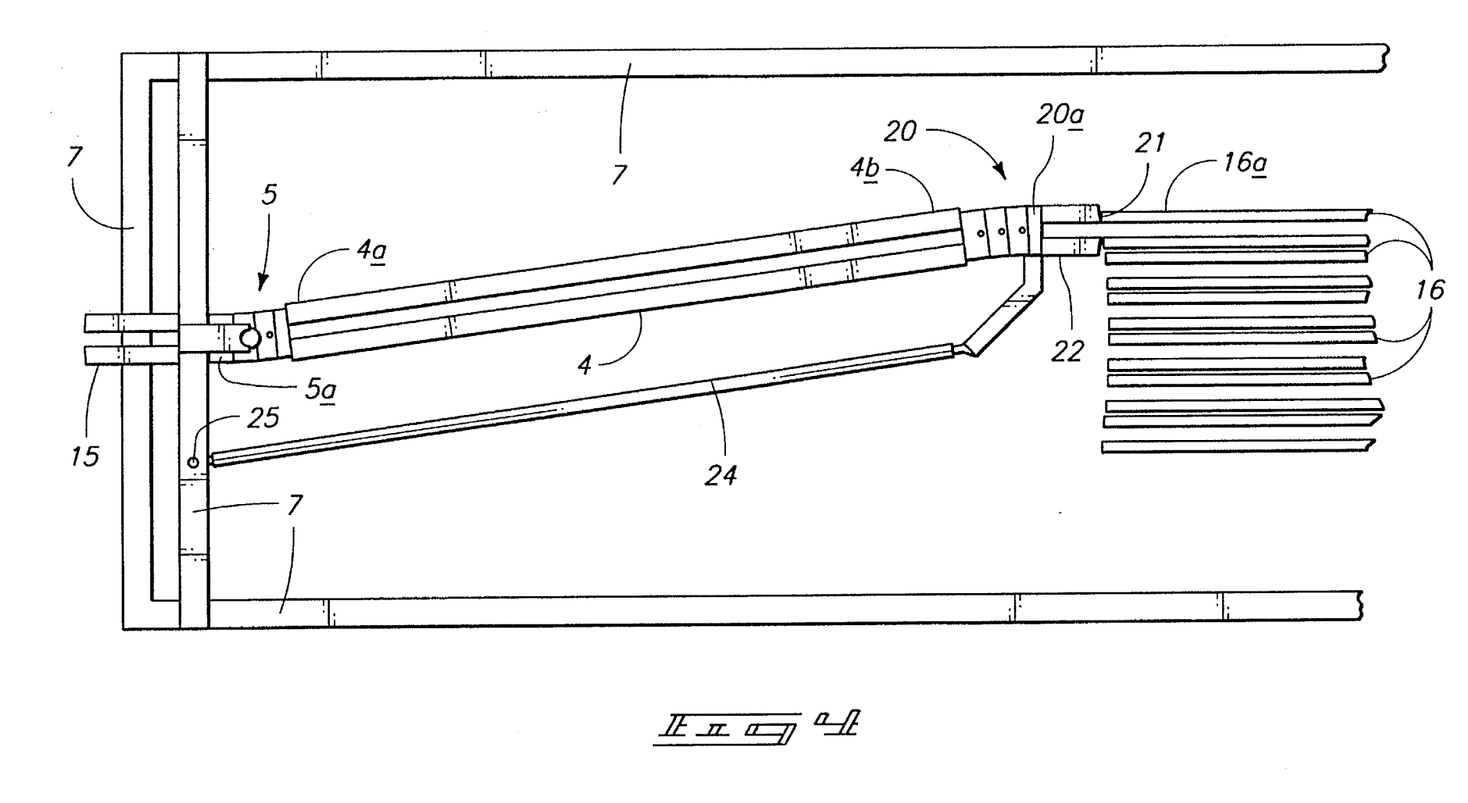
FIG. 4 is a top view of the application of the invention wherein there are two flexible guide joints, one at the first end of the swing-arm conveyor and the second at the second end of the swing-arm conveyor.

FIG. 4 is a top view of the swing-arm conveyor 4 illustrating two flexible guide joints, a first flexible guide joint 5 at a first end 4a of the swing arm conveyor and a second flexible guide joint 20 at a second end 4b of the swing-arm conveyor 4.

The combination of the first flexible guide joint 5 and the second flexible guide joint 20 allow the bottles to be received in a direction parallel to that in which they are conveyed, regardless of the direction of the flow of the bottles. The utilization of two flexible guide joints feeding and receiving bottles in parallel directions results in a much lower rate of jamming at the interface 21 between conveyors 4 and 16.

FIG. 4 illustrates the second flexible joint 20 connected to an extended coupling 22 which further facilitates the operative connection to a selected air conveyor 16 in a direction parallel to the direction of travel of bottles in the single lane conveyor 15.

FIG. 4 further illustrates an alignment member 24 pivotally attached to framework 7 at pivot point 25 and apart from the swing-arm conveyor 4, and rigidly connected to the outward terminal link 20a to maintain the direction of flow of the bottles in outward terminal link 20a parallel to the direction of flow of the bottles in outward terminal link 5a in the first flexible guide joint 5. The alignment member 24 maintains the parallelogram as the swing-arm conveyor 4 is selectively moved from one of the plurality of parallel bottle paths to another.

In FIGS. 3 and 4, a covering air plenum extending over the swing arm conveyor is not illustrated, thus exposing the guide rails on which moving bottles are supported. An elongated enclosure above the guide rails can include conventional fins or diverters for directionally introducing moving air that impinges on the bottles to propel them along the guide rails. Examples of such air conveyors are well known. Exemplary conveyor assemblies are illustrated by U.S. Pat. Nos. 3,850,478, 4,284,370, and 5,100,265, all of which are hereby incorporated into this disclosure by reference.

Figure 5:
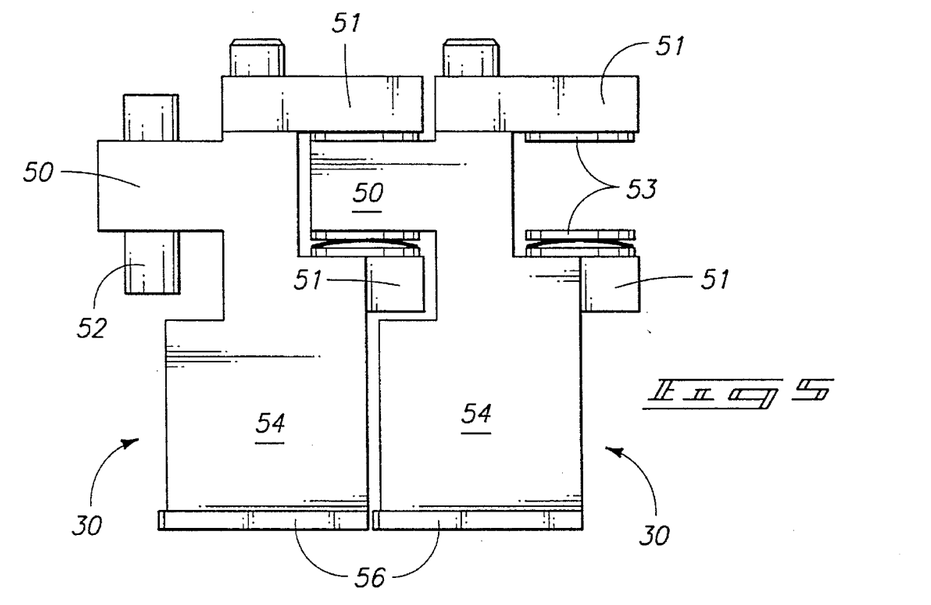
FIG. 5 is a plan view of a joint member which can be used in the flexible guide joint.

FIG. 5 illustrates one example of a joint member 30 which can be used in flexible guide joints. The upper body portion of the flexible guide joint links the joint member to adjacent joint members. The lower body portion serves as the passageway for that portion of the bottle from the neck flange up and as a plenum for the flow of air generated by air conveyors, forming a continuous conveyance path for the bottles.

The upper body portion of joint member 30 forms an engaging link 50 and a recipient link 51. The engaging link 50 can be inserted into the opening of an adjacent recipient link 51 such that a vertical link pin 52 can be inserted through both the engaging link 50 and the recipient link 51 of interconnected joint members.

The recipient link 51 has bushings 53 to pivotally receive the engaging link 50 of the adjacent joint member.

Once the engaging link 50 illustrated in FIG. 5 is inserted into a recipient link 51 such that the corresponding holes in each are aligned, a link pin 52 can be inserted through the aligned holes in both the engaging link 50 and the recipient link 51. Link pin 52 then serves as the axis around which adjacent joint members 30 pivot with respect to one another.

The lower body portion 54 of the joint member, as further shown in FIG. 6, includes a U-shaped chamber 55 defined by side walls 55b and chamber ceiling 55a, with the neck flange guide rails 56 completing the chamber. The inner edges 56a of guide rails 56, extending in opposition to one another, are the support and conveying surface for the neck flange 57 of the bottles.

The chamber 55, when combined with corresponding chambers of adjacent joint members, serves as an air passageway for air used as a conveying force in the adjacent air conveyor(s). It provides a continuous conveyance channel through which the portions of moving bottles above and including the neck flanges pass while being conveyed.

FIG. 6 shows a bottle, including a bottle body portion 60, a bottle neck 59, a neck flange 57, and threads 58, supported by the inner edges 56a of the neck flange guide rails 56.

The elongated opening created between the inner edges 56a of the two neck flange guide rails 56 is slightly wider than the diameter of the bottle neck 59 immediately below the neck flange 57. It is also sufficiently smaller than the diameter of the neck flange 57 such that the neck flange 57 is supported by the guide rails 56 while the bottle neck 59 passes through the elongated opening freely and without binding.

Figure 7:
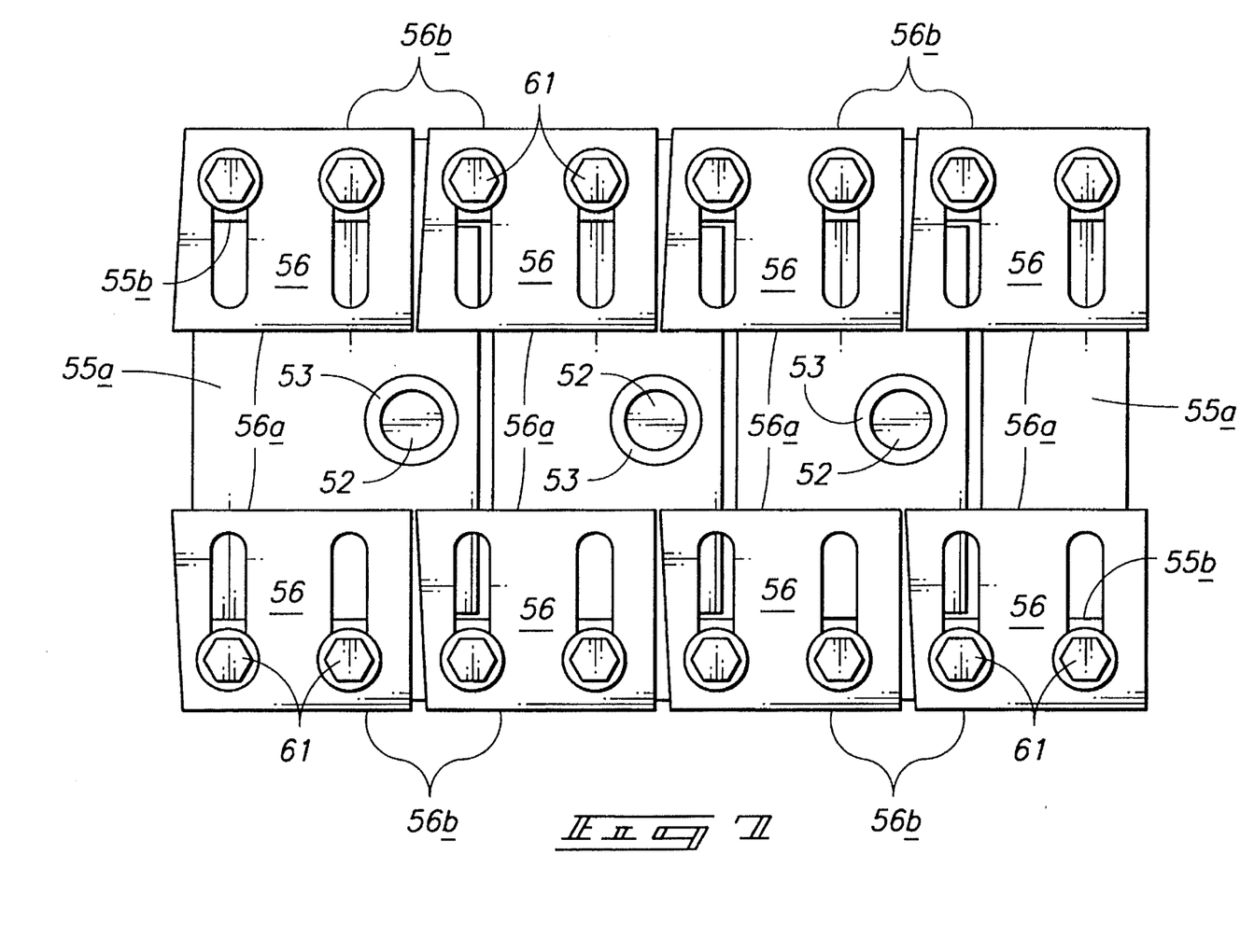
FIG. 7 is a bottom view of one application of a flexible guide joint in a linear position.

FIG. 7 shows a bottom view of a joint member, including neck flange guide rails 56 with inwardly opposing inner edges 56a, forming a continuous conveyance path for bottles. The neck flange guide rails 56 can be attached to the lower body portion of the joint members by bolts 61 or other known attachment means.

Outer edges 56b of neck flange guide rails 56 are shorter in length than the corresponding inner edges 56a. The differences in their lengths facilitates bending of the flexible guide joints and thereby presents a more continuous conveyance path for supported bottles while the flexible guide joint is in a bent position.

Figure 8:
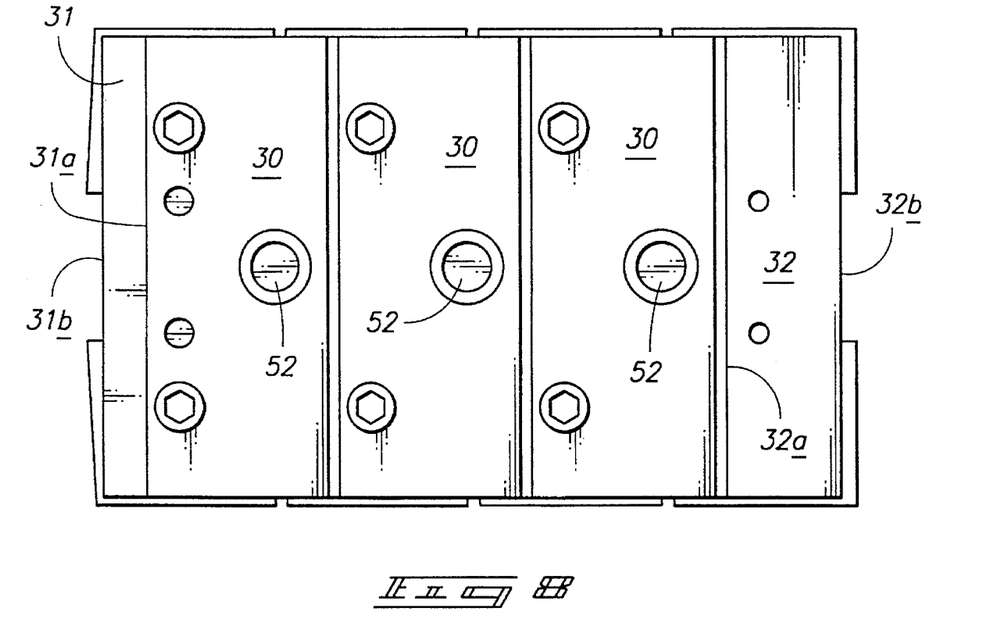
FIG. 8 is a top view of one application of a flexible guide joint in a linear position.
Figure 9:
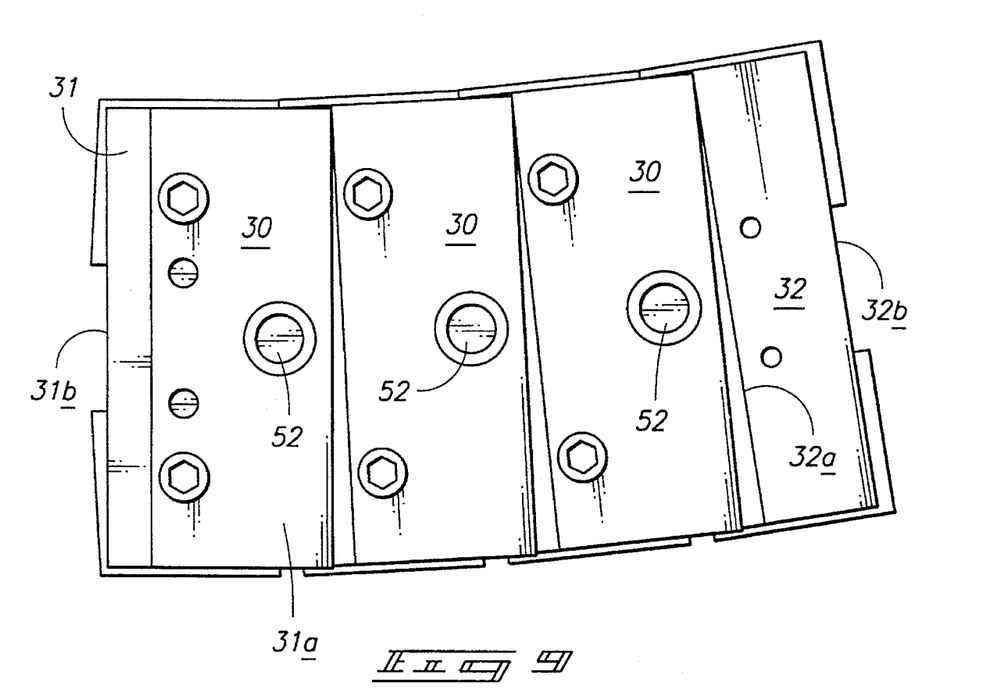
FIG. 9 is a top view of one application of a flexible guide joint in a flexed position.

FIG. 8 is a top view of a flexible guide joint in a linear configuration. It shows the tops of three joint members 30, a first terminal link 31, and a second terminal link 32. FIG. 9 shows the same top view with the flexible guide joint bent or flexed about a vertical axis.

Each flexible guide joint also includes a first terminal link 31 at one end and a second terminal link 32 at the other end. The terminal links 31 and 32 at the respective ends of the flexible guide joint allows the joint to be operatively connected to an adjacent air conveyor or a coupling 22, which, in turn, is operatively connected to an adjacent air conveyor.

The upper body portions of terminal link joint members are different from the joint members described above. Depending on which end of the joint member the terminal link is located at, it only includes either a recipient link 51 or an engaging link 50. The other end of the upper body portion comprises a connector to allow the terminal link to operatively connect to either an air conveyor or a coupling. The connector side of the terminal link can be attached to either the air conveyor or the coupling by any one of a number of known means.

The first side 31a of the first terminal link 31 shown in FIGS. 8 and 9 is operatively connected to an adjacent joint member 30, whereas its second side 31b can be attached either to an air conveyor or to a coupler 22. The same is true for the first side 32a and the second side 32b of the second terminal link 32.

FIG. 10 is a bottom view illustrating the relative pivoting that takes place between adjacent joint members and the continuous conveyance path that is maintained between the inner edges 56a of the neck flange guide rails 56 when the flexible guide joint is bent about a vertical axis.

In the application of this invention utilizing a single lane path or source of bottles, that source can be an air conveyor or other conveyance means. The bottles are received in the first flexible guide joint 5 from the single-lane source of bottles. The abutting bottles then pass through the first flexible guide joint 5 as a result of the conveying force provided along the single-lane conveyor, or auxiliary air can be added. From the first flexible guide joint 5, the bottles then enter and are conveyed through the swing-arm conveyor 4 to the second flexible guide joint 20.

The abutting bottles pass through the second flexible guide joint 20 as a result of the conveying force provided along the swing-arm conveyor 4, pass through the coupler 22 and are delivered to a selected one of the plurality of recipient air conveyors.

In the application of this invention utilizing a plurality of air conveyors 16 to feed a single recipient air conveyor 15, the process occurs in an order opposite to that just described above.

Figure 11:
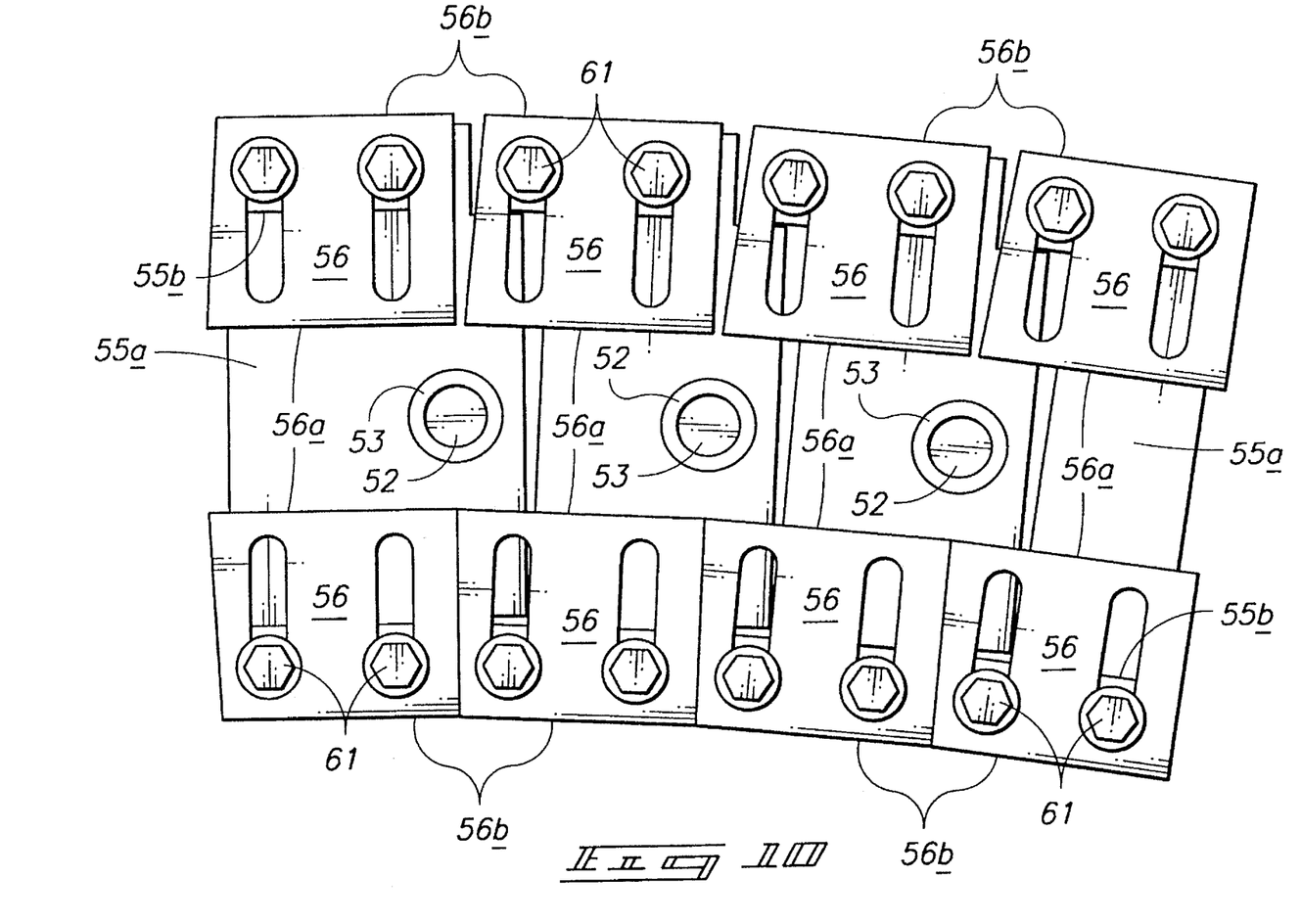
FIG. 11 is an elevation view of one application of the invention and illustrating an air plenum for the swing-arm air conveyor.

FIG. 11 shows air plenum 71 for swing-arm air conveyor 4. Air is transferred through louvers 72 to the bottles being conveyed. The swing-arm conveyor is pivotally mounted to framework 7 such that it can be angularly moved about vertical axis 90, with bearings 79 facilitating the movement. Bottle guides 78 control the lateral movement of the body of the bottles while being conveyed, as further illustrated in FIG. 13.

Alignment member 24 is attached to the outward terminal link 20a of the second flexible guide joint to maintain the direction of flow through outward terminal link 20a parallel to the direction of flow of the bottles in outward terminal link 5a in the first flexible guide joint. Since outward terminal link 20a is maintained parallel to the outward terminal link 5a of the first flexible guide joint, the remaining end of the swing-arm conveyor pivotally rotates with respect to the outward terminal link 20a of the second flexible guide joint about vertical axis 81, facilitated by bearings 80.

A drive mechanism is operably connected to the swing-arm conveyor to selectively move its remaining end from one of the plurality of parallel bottle paths to another. The drive mechanism illustrated on FIG. 11 includes transverse guide rods 73, a movable frame 74 slidably mounted on the guide rods 73, and a transverse driver 76 operably connected to the movable frame 74. The transverse driver 76 is a servomotor.

Figure 13:
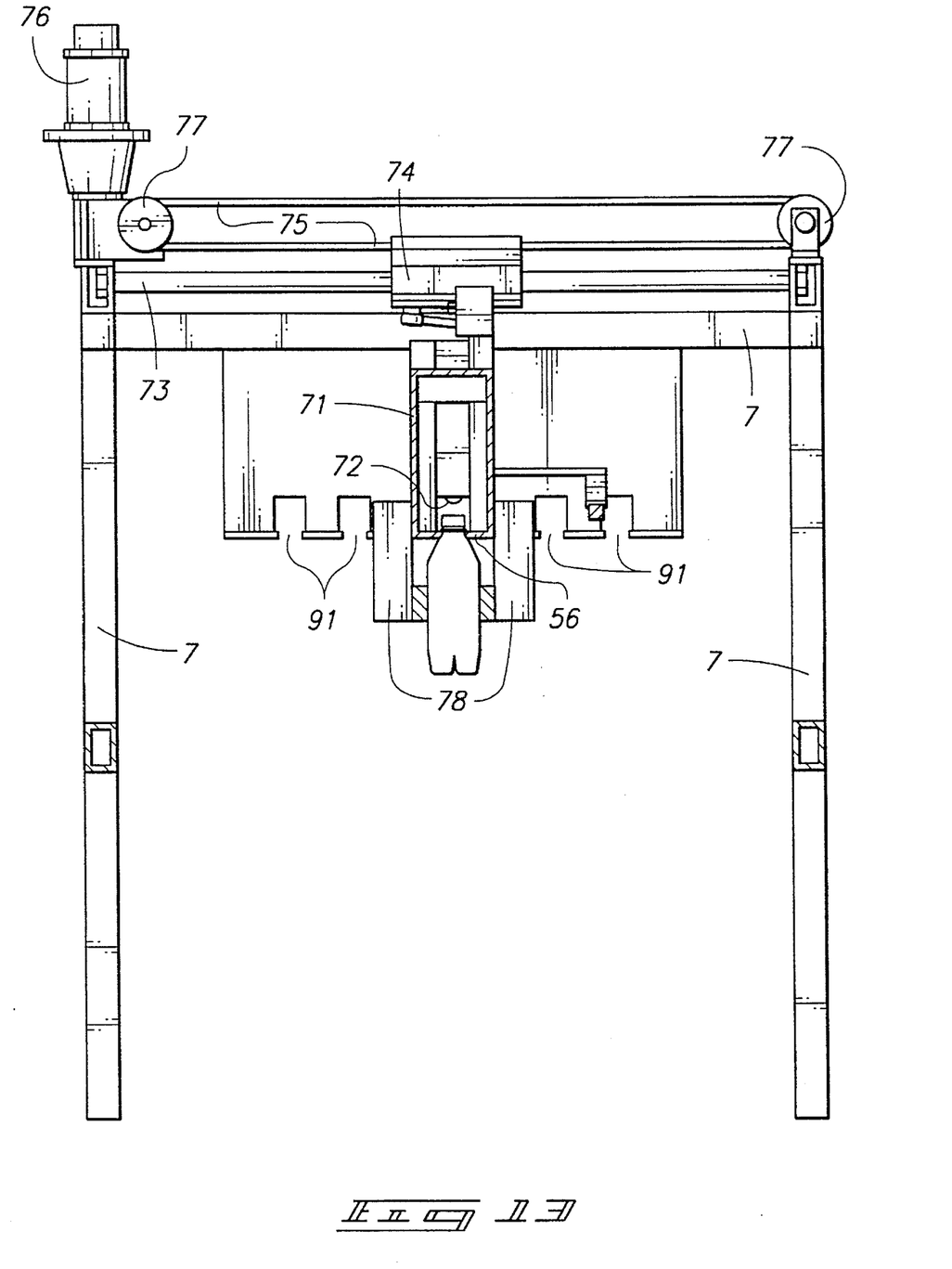
FIG. 13 is a section view as indicated from section line 13—13 as shown in FIG. 11.

FIGS. 12 and 13 further illustrate these components along with transverse drive belt 75 which is operably connected to movable frame 74. Sufficient lost motion or flexibility is included in the connections between frame 74 and swing-arm conveyor 4 to accomodate the arc of motion across the recipient air conveyors. Transverse drive belt 75 is operably connected to drive pulleys 77, which are attached to framework 7.

FIG. 12 is a top view which further illustrates transverse drive mechanism components, including the transverse driver 76, the movable frame 74, the air plenum 71 of the swing-arm conveyor and the alignment member 24. Drive belt 75 is operably connected to transverse driver 76 and to movable frame 74. Pulleys 77 facilitate the movement of the movable frame 74 via the drive belt 75.

FIG. 13, a section from FIG. 11 as indicated, further illustrates the drive mechanism in relation to the plurality of parallel bottle paths 91, including the transverse driver 76, which is a servomotor, pulleys 77 mounted to the framework 7, and drive belt 75 being operably connected to the transverse driver 76 and the drive belt 75.

In compliance with the statute, the invention has been described in language more or less specific as to methodical features. It is to be understood, however, that the invention is not limited to the specific features described since the means herein disclosed comprise preferred forms of putting the invention into effect. The invention is, therefore, claimed in any of its forms of modifications within the proper scope of the appended claims appropriately interpreted in accordance with the doctrine of equivalents.

We claim:

1. A flexible guide joint for operatively connecting two air conveyors which convey bottles which are suspended by their neck flanges, the flexible guide joint comprising:
   a plurality of joint members, each of which includes:
   (a) an upper body portion forming a recipient link and an engaging link, the engaging link of each joint member being pivotally connected to the recipient link adjacent said joint member; and
   (b) a lower body portion forming a conveyance chamber having two neck flange guide rails, the two neck flange guide rails including inner edges extending in opposition to one another and spaced transversely apart to support the neck flanges of the bottles, inner edges of the neck flange guide rails forming a conveyance channel for the bottles when the adjacent joint members are connected;
   wherein an angle between the inner edges of the neck flange guide rails of the adjacent joint members is adjustable about vertical axes while still forming a substantially continuous conveyance channel along the respective neck flange guide rails.

2. A flexible guide joint as recited in claim 1, and further comprising:
   a terminal link at one end of the flexible guide joint, an upper body portion of the terminal link forming a link element pivotally connected to the upper body portion of the link adjacent said joint member; and
   a connector operatively connecting the terminal link to one of the two air conveyors.

3. A flexible guide joint as recited in claim 1, and further comprising:
   a terminal link at one end of the flexible guide joint, an upper body portion of the terminal link forming a link element pivotally connected to the upper body portion of either the engaging link or the recipient link adjacent said joint member;
   a connector operatively connecting the terminal link to one of the two air conveyors; and
   a complementary terminal link pivotally connected at a remaining end of the flexible guide joint.

4. A flexible guide joint as recited in claim 1, and further comprising:
   a terminal link at one end of the flexible guide joint, an upper body portion of the terminal link forming a link element pivotally connected to the upper body portion of either the engaging link or the recipient link adjacent said joint member;
   a connector operatively connecting the terminal link to one of the two air conveyors; and
   a complementary terminal link pivotally connected at a remaining end of the flexible guide joint;
   wherein the joint members and the terminal links comprise a continuous conveyance path through which the bottles pass without obstruction.

5. An air conveyor apparatus for conveying bottles which are suspended by their neck flanges, between a single bottle path and a plurality of parallel bottle paths, the air conveyor apparatus comprising:
   a rigid framework;
   a swing-arm air conveyor having a first end angularly movable relative to the framework about a vertical axis, the first end of the swing-arm conveyor including a first flexible guide joint connected to a first end of the framework to define the single bottle path, a remaining end of the swing-arm conveyor being positioned adjacent to a selected bottle path of the plurality of parallel bottle paths, being arranged side-by-side across the framework, such that the bottles flow between the single bottle path and the selected bottle path through the swing-arm air conveyor, the swing-arm conveyor further comprising:
   (a) a conveyance chamber having two neck flange guide rails, the two neck flange guide rails including inner edges extending in opposition to one another and spaced transversely apart to support the neck flanges of the bottles; and
   a drive mechanism operably connected to the swing-arm conveyor to selectively move the remaining end thereof from one of the plurality of parallel bottle paths to another.

6. An air conveyor apparatus as recited in claim 5, wherein the first flexible guide joint comprises:
   a plurality of joint members, each of which includes:
   (a) an upper body portion forming a recipient link and an engaging link, the engaging link of each joint member being pivotally connected to the recipient link of the adjacent joint member; and
   (b) a lower body portion forming a conveyance chamber having two neck flange guide rails, the two neck flange guide rails thereof including inner edges extending in opposition to one another and spaced transversely apart to support the neck flanges of the bottles, the inner edges of the two neck flange guide rails thereof in opposition to one another forming a conveyance channel for the bottles when the adjacent joint members are connected;

wherein an angle between the inner edges of the neck flange guide rails of the adjacent joint members is adjustable about vertical axes while still forming a substantially continuous conveyance channel along the respective neck flange guide rails.

7. An air conveyor apparatus as recited in claim 5, and in which the drive mechanism comprises:

(a) a transverse guide rod;

(b) a movable frame slidably mounted on the guide rod; and (c) a transverse driver operably connected to the movable frame.

8. An air conveyor apparatus for conveying bottles which are suspended by their neck flanges, between a single bottle path and a plurality of parallel bottle paths, the air conveyor apparatus comprising:

a rigid framework;

a swing-arm air conveyor having a first end angularly movable relative to the framework about a vertical axis, the first end of the swing-arm conveyor including a first flexible guide joint connected to the framework, the first flexible joint defining a bottle path, and the swing-arm conveyor further comprising:

(a) a conveyance chamber having two neck flange guide rails, the two neck flange guide rails including inner edges extending in opposition to one another and spaced transversely apart to support the neck flanges of the bottles;

a second flexible guide joint attached to a remaining end of the swing-arm conveyor, the second flexible joint defining a bottle path, and being positioned adjacent to a selected bottle path of the plurality of parallel bottle paths, being arranged side-by-side across the framework, such that the bottles flow between the single bottle path and the selected bottle path through the swing-arm air conveyor; and a drive mechanism operably connected to the swing-arm conveyor to selectively move the remaining end of the swing-arm conveyor from one of the plurality of parallel bottle paths to another.

9. An air conveyor apparatus as recited in claim 8, wherein the second flexible guide joint delivers the bottles to the selected bottle path of the plurality of parallel bottle paths in a direction parallel to a direction of the single bottle path.

10. An air conveyor apparatus as recited in claim 8 and which further comprises:

an alignment member pivotally connected at a first end to a first end of the framework, the alignment member being spaced from and parallel to the swing-arm conveyor, the alignment member being rigidly connected at a second end to an outward terminal link of the second flexible guide joint;

the alignment member maintaining a direction of conveyance by the outward terminal link of the second flexible guide joint parallel to a direction of conveyance of an outward terminal link of the first flexible guide joint, as the remaining end of the swing-arm conveyor is selectively moved from one of the plurality of parallel bottle paths to another.

11. An air conveyor apparatus as recited in claim 8, and in which the mechanism operably connected to the swing-arm conveyor to selectively move the remaining end of the swing-arm conveyor from one of the plurality of parallel bottle paths to another comprises:

(a) a transverse guide rod;

(b) a movable frame slidably mounted on the guide rod; and (c) a transverse driver operably connected to the movable frame.

12. An air conveyor apparatus as recited in claim 8, wherein the first flexible guide joint and the second flexible guide joint each comprises:

a plurality of joint members, each of which includes:

(a) an upper body portion forming a recipient link and an engaging link, the engaging link of each joint member being pivotally connected to the recipient link adjacent said joint member; and (b) a lower body portion forming a conveyance chamber having two neck flange guide rails, the two neck flange guide rails thereof including inner edges extending in opposition to one another and spaced transversely apart to support the neck flanges of the bottles, inner edges of the neck flange guide rails thereof forming a conveyance channel for the bottles when the adjacent joint members are connected;

wherein an angle between the inner edges of the neck flange guide rails of the adjacent joint members is adjustable about vertical axes while still forming a substantially continuous conveyance channel along the respective neck flange guide rails.

13. A method for air conveying, on a rigid framework, bottles with a neck flange between a single bottle path and a plurality of bottle paths, comprising the following steps:

(a) movably mounting on the framework a swing-arm air conveyor having a first end angularly movable relative to the framework about a vertical axis, the first end of the swing-arm conveyor including a first flexible guide joint connected to a first end of the framework, the first flexible guide joint defining a bottle path, a remaining end of the swing-arm conveyor being positioned adjacent to a selected bottle path of the plurality of parallel bottle paths, being arranged side-by-side across the framework, such that the bottles flow between the single bottle path and the selected bottle path through the swing-arm air conveyor, the swing-arm conveyor further comprising:

(a) a conveyance chamber having two neck flange guide rails, the two neck flange guide rails including inner edges extending in opposition to one another and spaced transversely apart to support the neck flanges of the bottles; and (b) angularly moving the first end of the swing-arm conveyor relative to the framework, and thereby bending the first flexible guide joint, operatively connecting the remaining end of the swing-arm conveyor to the selected bottle path of the plurality of parallel bottle paths.

14. A method for conveying as recited in claim 13, wherein the first flexible guide joint comprises:

a plurality of joint members, each of which includes:

an upper body portion forming a recipient link and an engaging link, the engaging link of each joint member being pivotally connected to the recipient link adjacent said joint member; and a lower body portion forming a conveyance chamber having two neck flange guide rails, the two neck flange guide rails thereof including inner edges extending in opposition to one another and spaced transversely apart to support the neck flanges of the bottles, inner edges of the neck flange guide rails thereof forming a conveyance channel for the bottles when the adjacent joint members are connected;

said bending comprising adjusting the angles between the inner edges of the neck flange guide rails of the adjacent joint members about vertical axes while still forming a substantially continuous conveyance channel along the respective neck flange guide rails.

15. A method for conveying as recited in claim 13, and wherein:

a second flexible guide joint is attached to the remaining end of the swing-arm conveyor, the second flexible joint defining a bottle path and being positioned adjacent to the selected bottle path of the plurality of parallel bottle paths arranged side-by-side across the framework such that the bottles flow between the single bottle path and the selected bottle path through the swing-arm air conveyor; and the method further comprises moving the swing-arm conveyor from a selected one of the plurality of bottle paths to another while maintaining a direction of conveyance through an outer terminal link of the first flexible guide joint parallel to a direction of conveyance through an outer link of the second flexible guide joint.

* * * * *